US008001548B2

(12) United States Patent
Groff et al.

(10) Patent No.: US 8,001,548 B2
(45) Date of Patent: Aug. 16, 2011

(54) TRANSACTION PROCESSING FOR SIDE-EFFECTING ACTIONS IN TRANSACTIONAL MEMORY

(75) Inventors: Dana Groff, Sammamish, WA (US); Alexander Dadiomov, Redmond, WA (US); Yossi Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 12/254,745

(22) Filed: Oct. 20, 2008

(65) Prior Publication Data

US 2010/0100885 A1  Apr. 22, 2010

(51) Int. Cl.
*G06F 9/46* (2006.01)
*G06F 7/00* (2006.01)
*G06F 12/00* (2006.01)

(52) U.S. Cl. ........ 718/104; 707/687; 707/703; 711/147; 711/154

(58) Field of Classification Search .................. 718/101, 718/102, 104
See application file for complete search history.

(56) References Cited

U.S. PATENT DOCUMENTS

| | | | | |
|---|---|---|---|---|
| 5,504,899 A | * | 4/1996 | Raz | 1/1 |
| 5,504,900 A | * | 4/1996 | Raz | 1/1 |
| 5,701,480 A | * | 12/1997 | Raz | 718/101 |
| 6,434,710 B1 | * | 8/2002 | Sato et al. | 714/2 |
| 6,463,456 B1 | * | 10/2002 | Kan et al. | 709/201 |
| 6,728,958 B1 | * | 4/2004 | Klein et al. | 718/101 |
| 6,938,130 B2 | * | 8/2005 | Jacobson et al. | 711/144 |
| 7,206,903 B1 | | 4/2007 | Moir et al. | |
| 7,328,316 B2 | | 2/2008 | Moir et al. | |
| 7,620,850 B2 | * | 11/2009 | Lev et al. | 714/35 |
| 2004/0015642 A1 | * | 1/2004 | Moir et al. | 711/1 |
| 2007/0143741 A1 | | 6/2007 | Harris | |
| 2007/0169031 A1 | | 7/2007 | Harris | |
| 2007/0198979 A1 | | 8/2007 | Dice et al. | |
| 2008/0010532 A1 | | 1/2008 | Lev et al. | |
| 2008/0120299 A1 | | 5/2008 | Duffy et al. | |
| 2008/0140962 A1 | * | 6/2008 | Pattabiraman et al. | 711/162 |
| 2010/0017572 A1 | * | 1/2010 | Koka et al. | 711/159 |
| 2010/0083268 A1 | * | 4/2010 | Morris | 718/104 |

OTHER PUBLICATIONS

Carlstrom et al, "Executing Java Programs With Transactional Memory", Elsevier, 2006, pp. 111-129.*
Adl-Tabatabai et al, "Compiler and Runtime Support for Efficient Software Transactional Memory", ACM, 2006, pp. 26-37.*
Saha et al, "McRT-STM: A High Performnace Software Transactional Memory System for a Multi-Core Runtime", ACM, 2006, pp. 187-197.*
Shriraman et al, "Hardware Acceleration of Software Transactional Memory", University of Rochester, 2005, pp. 1-22.*
PCT International Search Report for International Application No. PCT/US2009/060960 mailed Apr. 20, 2010 (7 pages).

(Continued)

*Primary Examiner* — Jennifer N To

(57) ABSTRACT

A processing system includes a transactional memory, first and second resource managers, and a transaction manager for a concurrent program having a thread including an atomic transaction having a side-effecting action. The first resource manager is configured to enlist in the atomic transaction and manage a resource related to the side effecting action. The second resource manager is configured to enlist in the atomic transaction and manage the transaction memory. The transaction manager is coupled to the first and second resource managers and manager is configured to receive a vote from the first and second resource managers as to whether to commit the transaction. The side-effecting action is postponed until after the transaction commits or applied along with a compensating action to the side-effecting action.

20 Claims, 3 Drawing Sheets

OTHER PUBLICATIONS

PCT Written Opinion of the International Searching Authority for International Application No. PCT/US2009/060960 mailed Apr. 20, 2010 (3 pages).

Riegel, et al., "Snapshot Isolation for Software Transactional Memory", retrieved at <<http://wwwse.inf.tu-dresden.de/papers/preprint-riegel2006sistm.pdf>>, pp. 10.

Harris, et al., "Composable Memory Transactions", Proceedings of the tenth ACM SIGPLAN symposium on Principles and practice of parallel programming, retrieved at <<http://research.microsoft.com/~simonpj/papers/stm/stm.pdf>>, 2005, pp. 48-60.

Herlihy, et al., "Software Transactional Memory for Dynamic Sized Data Structures", In Proceedings of the twenty-second annual symposium on Principles of distributed computing, retrieved at <<http://www.cs.rice.edu/~wns1/papers/2003-PODC-DSTM.pdf>>, Jul. 13-16, 2003, pp. 10.

Carlstrom, et al., "Transactional Collection Classes", Proceedings of the 12th ACM SIGPLAN symposium on Principles and practice of parallel programming, retrieved at <<http://people.csail.mit.edu/mcarbin/papers/ppopp07.pdf>>, Mar. 14-17, 2007, pp. 12.

* cited by examiner

TRANSACTION PROCESSING FOR SIDE-EFFECTING ACTIONS IN TRANSACTIONAL MEMORY

BACKGROUND

Concurrent programming for shared-memory multiprocessors can include the ability for multiple threads to access the same data. The multiple threads execute on multiple processors, multiple processor cores, or other classes of parallelism that are attached to a memory shared between the processors. The shared-memory model is the most commonly deployed method of multithread communication. It allows multithreaded programs to be created in much the same way as sequential programming, which is a benefit because concurrent programming is itself notoriously difficult. In order to implement the shared-memory model, concurrent programming uses care to avoid concurrent access and use of shared data that can create undesirable conditions such as races and the like.

Locks are a common solution to avoid the problem of concurrent access to shared data. Locks are centered on a premise that variables accessed by one thread will also be accessed by other threads, and thus the variable can only be used by one thread at a time. Locks allow one thread to take control of a variable and prevent other threads from changing the variable until it is unlocked. Lock-based protocols, while popular, are often considered difficult to use. Using locks in a coarse-grained way protects relatively large amounts of data, but generally their use does not scale. Threads block one another even when they do not interfere, and the locks become a source of contention. Alternatively, using locks in a more fine-grained way while mitigating scalability issues introduces other problems because the locking conventions to ensure correctness and avoid deadlocks become complex and error prone.

Another solution is to implement applications using transactional memory, such as a software transactional memory that provides semantics in a software runtime library and/or runtime execution environment and/or using compilers. Transactional memory is a concurrency control mechanism for controlling access to shared memory based on the premise that variables used by one thread will likely not be accessed by other threads, and thus the variable can be shared without harsh ramifications to the scalability of the program.

One significant benefit of transactional memory over coarse-lock-based protocols is increased concurrency. In transactional memory, no thread needs to wait for access to data, and different threads can safely and simultaneously modify disjoint parts of a data structure that would normally be protected under the same lock. Despite the overhead of retrying transactions that fail, in most realistic concurrent programs conflicts arise rarely enough that there is an immense performance gain over course-grained lock-based protocols on even small numbers of processors or processor cores.

Problems can occur in the use of transactional memory, however, if an atomic block includes a side-effecting action. In general, a side-effecting action modifies some state visible outside of the current thread. Common examples of side-effecting actions include input/output, system calls, legacy code actions, kernel actions, device management, actions in other domains outside of the managed environment, and so on. Difficulties arise if the transaction is aborted and re-executed, because the side-effecting action is re-executed and can be re-executed multiple times upon repeated failures. Non-idempotent side effects pose the greatest difficulties. For example, an atomic block including the action of increment-a-variable and the side-effecting action of print-the-variable may repeatedly fail and re-execute as a result of memory collisions with other threads. In each re-execution the variable is printed, which is undesirable if the intent was to print the variable only once.

Others have attempted to address the issue of side-effecting actions used in transactional memory. One popular solution is simply to forbid the use of such side-effecting actions, but many researchers generally agree that limitations on programmability and composition are unacceptable in general use. Other proposed solutions defer the action until it is likely to commit, but many researchers believe that reordering of actions leads to unintended consequences. Similarly, associating a compensation block with the action reduces isolation and provides another source for bugs. Another proposed solution is to not allow transactions with side-effecting action to fail and resolving all collisions in favor of the transaction with the side-effecting actions. Of course, no more than one transaction with a side-effecting action is allowed at once. Still another solution is to break atomicity and isolation of the transaction. All of these proposed solutions, as well as others, are restricting in different ways and require significant effort from the programmer. Researchers generally agree that this problem remains unsolved.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment a processing system processes an atomic transaction having a side-effecting action. The transaction is part of a thread in a concurrent program having a plurality of threads. The system includes a transactional memory, first and second resource managers, and a transaction manager. The first resource manager enlists in the atomic transaction and manages a resource related to the side effecting action. The second resource manager enlists in the atomic transaction and manages the transactional memory. The transaction manager is coupled to the first and second resource managers and receives a vote from the first and second resource managers as to whether to commit the transaction. The side-effecting action is postponed until after the transaction commits or applied along with a compensating action to the side-effecting action.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
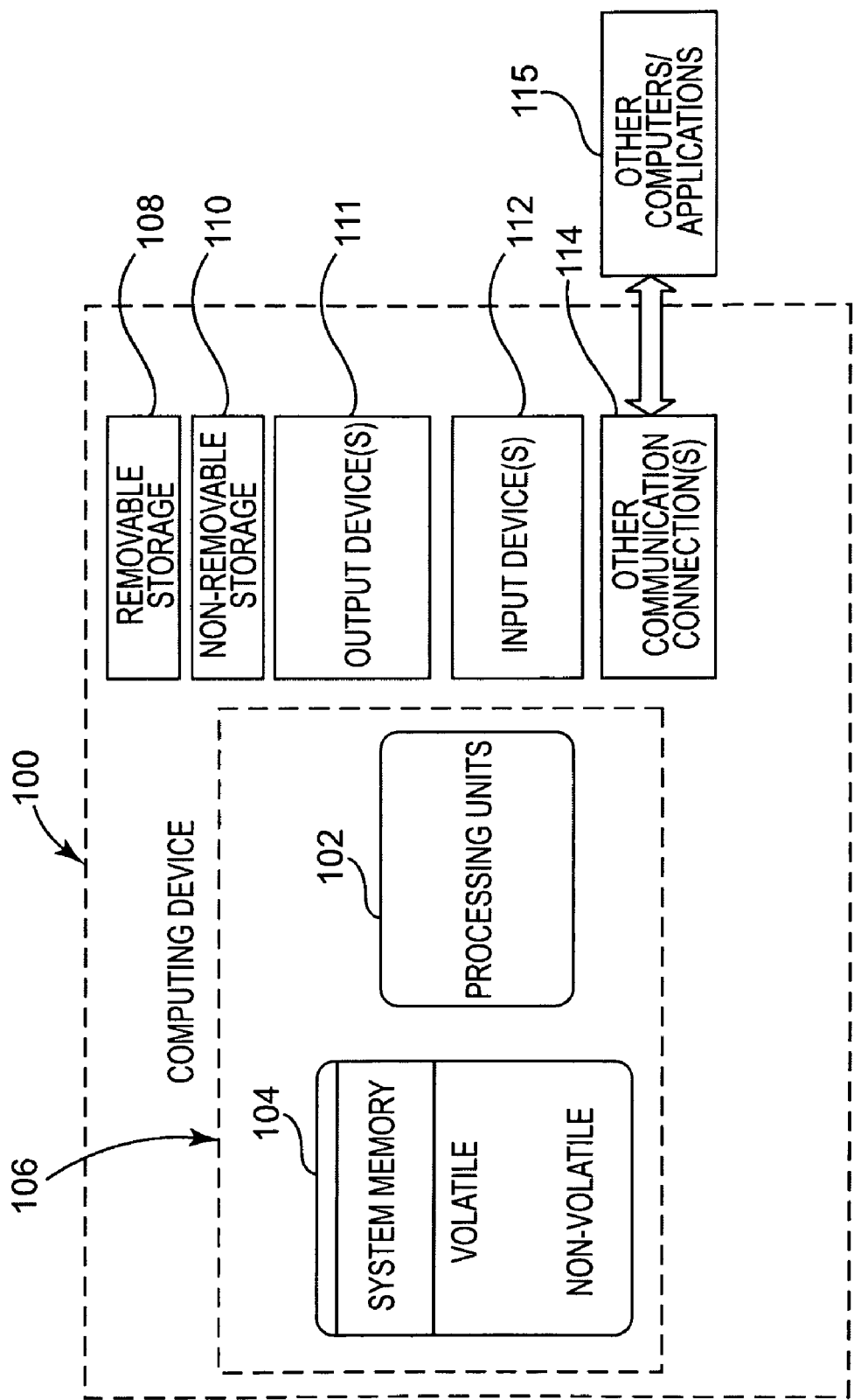
FIG. 1 is a block diagram illustrating one of many possible examples of computing devices implementing the features of the present disclosure.

FIG. 1 illustrates an exemplary computer system that can be employed as an operating environment and includes a computing device, such as computing device 100. In a basic configuration, computing device 100 typically includes a processor architecture having at least two processing units, (i.e., processors 102), and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by line 106. The computing device can take one or more of several forms. Such forms include a personal computer, a server, a handheld device, a consumer electronic device (such as a video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications/users 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

Computing system 100 can be configured to run an operating system software program and one or more software applications, which make up a system platform. In one example, computing system 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102.

Figure 2:
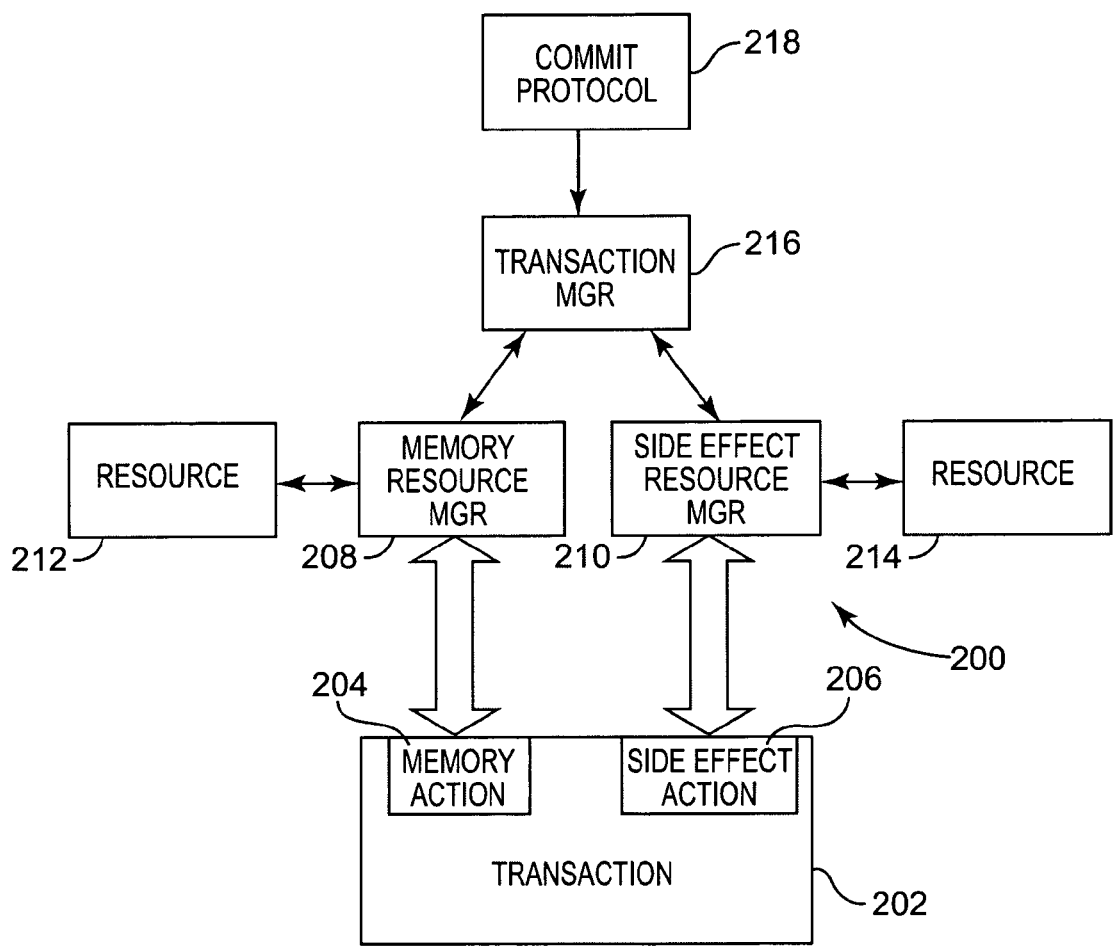
FIG. 2 is a block diagram illustrating an example transaction system in the example computing system of FIG. 1.

FIG. 2 illustrates an example transaction processing system 200 that can be called in the managed environment to support an atomic bock transaction 202 with a transactional memory action 204 and a side-effecting action 206. The system 200 includes at least two resource managers, such as a memory resource manager 208 and a side-effecting resource manager 210, enlisted into the transaction 202 and correspond with actions 204 and 206, respectively. The resource managers 208, 210 each manage action-appropriate resources 212, 214 that participate in the transaction 202. The actions of the resource managers 208, 210 are coordinated with a transaction manager 216, which works with the resource managers 208, 210 to ensure atomicity and isolation of the transaction 202. The transaction manager 216 implements a commit protocol 218. The resource managers 208, 210 also participate in the commit protocol 218.

A transaction 202 is a sequence of bound-together actions executed by a single thread. An example of bound-together actions includes atomic actions. A thread completes modifications to data in the shared memory without regard for other threads concurrently running on the other processors. After completing a transaction, the transactional memory verifies that other threads have not concurrently made changes to the accessed data. The changes are validated and, if the validation is successful, made permanent in a commit operation. If the validation fails, the changes are undone or "rolled back," and the transaction 202 is re-executed until the validation is successful.

Transactions possess the features of atomicity and isolation. Transactions are atomic and are logically performed instantaneously. If one action fails then the entire transaction fails. Also, the transaction is isolated from other threads in that no variables are exposed to other threads in their intermediate states. When the end of a block is reached, the transaction is committed, aborted or rolled-back and re-executed. Accordingly, the unit that commits or fails is a transaction rather than the entire process, and the state is returned to its original form rather than exposing intermediate variables.

Resource managers exist in traditional transactional processing and manage resources in traditional transactions. But traditional transaction processing so far has not been used to automatically address concurrent access to memory, which has often used locks. A feature of the present example is that management of the transactional memory is part of the transaction unlike traditional transactions that do not control access to shared memory. As discussed above, transactional memory proposals generally provide recovery functionality by manually crafting solutions for a limited set of error cases that the developers know how to deal with, and as a result suffer the productivity and quality consequences. The examples of the present disclosure, however, incorporate transactional memory into some mainstream transaction processing. The managed environment can provide or include preprogrammed appropriate resource managers for anticipated actions in transactional memory environment as well.

The preprogrammed resource managers can be included in a library that can be called in the managed environment when a resource is to be used.

In many cases where an appropriate resource manager does not exist in the preprogrammed library of resource managers for the managed transactional memory environment, a program developer can write a resource manager for use in the program or add it to the library.

In one example, the resource managers 208, 210 are implemented as volatile resource managers rather than durable ones. Volatile resource managers store their state in a volatile memory and do not support transactional state recovery. In the case of the transaction processing system 200, volatile resource managers use fewer system resources than durable resource managers. An example transaction manager 216 that works well with multiple volatile resource managers is an available lightweight transaction manager, which can significantly reduce overhead resulting from more durable transaction managers. Other examples can include durable transaction managers or resource managers.

The resource managers 208, 210 automatically enlist in the transaction 202 and commit or roll back changes made to their state according to the outcome of the transaction. The managed environment can automate the enlistment in the transaction and the management of the transaction with respect to the transactional resources 212, 214. In enlisting a resource 212, 214 in a transaction 202, the transaction informs the resource that an action 204, 206 wants to perform transactional work against the resource. The action 204, 206 then performs work against the resource 212, 214, and if no error occurs, the transaction manager 216 applies the commit protocol 218 to ask the resource 212, 214 through the resource manager 208, 210 to commit the changes made to its state. If either of the resource managers 208, 210 encounters an error, the transaction manager 216 will cause a roll back of all changes made in the transaction. Otherwise, the transaction manager 216 will cause the transaction to commit. In either case, the transaction manager 216 can inform the resource managers 208, 210 of the decision.

In one example, the memory resource manager 208 acts as a transaction manager before another resource manager enlists in the transaction 202. Once another resource manager enlists, such as the side-effecting action resource manager 210, the transaction processing system 200 promotes the transaction 202 to one employing the transaction manager 216, and the memory resource 208 becomes a resource manager.

In the example transaction 202 including a side-effecting action in transactional memory, at least two resource managers 208, 210 are enlisted in the transaction. The side effecting action 206 is a good example of an action that works against the resource 214. The transactional memory action 204 also implements a resource manager to manage its memory changes. If the transaction includes other side effecting actions, additional resource managers can be deployed.

The resource manager 210 postpones the side-effecting action until after the transaction manager 216 confirms that all enlisted resource managers voted to commit the transaction. Accordingly, the side effecting action is not re-executed, or repeatedly re-executed in the case of memory collisions with other concurrently executing threads that would normally cause the transaction to roll back if made before the validation phase. The developer can implement postponing the side-effecting action in an appropriate way. In the example of the side-effecting action of printing described above, the resource manager postpones printing until the transactional memory determines the transaction does not involve memory collisions with other threads. Prior to the transaction manager 216 calling the commit protocol 218, the resource manager for a print operation can write the line in a memory. After the transaction manager 216 has notified the resource manager of a commit, the resource manager will access the line in memory and print it. There are other similar examples of the developer implementing postponing a side-effecting action in a way that is appropriate to the given situation and example type of side-effecting action.

Convenient syntax may be offered to the developer, to making it easier to express delayed actions of the resource manager 210. For instance, an in-line delayed action can include a syntax like:

```
Atomic {
    <some actions, comprising transaction>
    AfterCommit (<delayed action>);
    // the parameter holds closure of the delayed action
    <some more actions, comprising transaction >
}
```

Implementation of "AfterCommit" can represent the resource manager 210, which executes the delayed action if or when the transaction manager 216 has notified the resource manager 210 of a commit. In one embodiment, for the benefit of the developer, this resource manager 210 functionality is implemented once by the system per transaction. In this embodiment, the developer specifies the delayed action inline through the "AfterCommit" primitive.

Instead of delaying the side-effecting action, the developer may prefer compensating for it. If the side-effecting action is not postponed (for instance, the application generates some allocation to continue the transaction), the application can proceed with the side-effecting action inside the transaction, but register the compensating action, to be called at rollback. If the transaction is re-executed multiple times because of repeated memory collisions, the compensating action is registered along with the execution of each side-effecting operation. Accordingly every rollback can call a specified compensating action. If a compensating action is the choice, side effects will be visible outside of the transaction during every re-execution, but eventually will be compensated for at rollback. Upon the, successful in a one example, re-execution, there will not be a compensating action. The concept of allowing non-isolated side-effecting actions inside a transaction is called "open-nested transactions." Developers are free to decide whether an open-nesting is appropriate in a given situation. A compensating action can also be implemented as a resource manager 210, similar to the case of delayed action. In one embodiment, such an implementation provides for proper reliability of an invocation of the compensating action where the system does not fail to call the compensating action after it executes the specific side-effecting action in the transaction.

As with the delayed actions, convenient syntax may be offered to the developer, making it easier to express compensating actions. For instance, an in-line open-nested action with compensation can include a syntax like:

```
Atomic {
    <some actions, comprising transaction>
    DoWithCompensation (
        <non-isolated side-effecting action>,
        // closure of the side-effecting action
```

```
    <compensation to be called at rollback>
        // closure of the compensating action
    );
    <some more actions, comprising transaction continuation>
}
```

The present disclosure proposes generating delayed and compensating actions from the resource manager, which can be programmed to preserve acceptable degrees of isolation and reliability.

Figure 3:
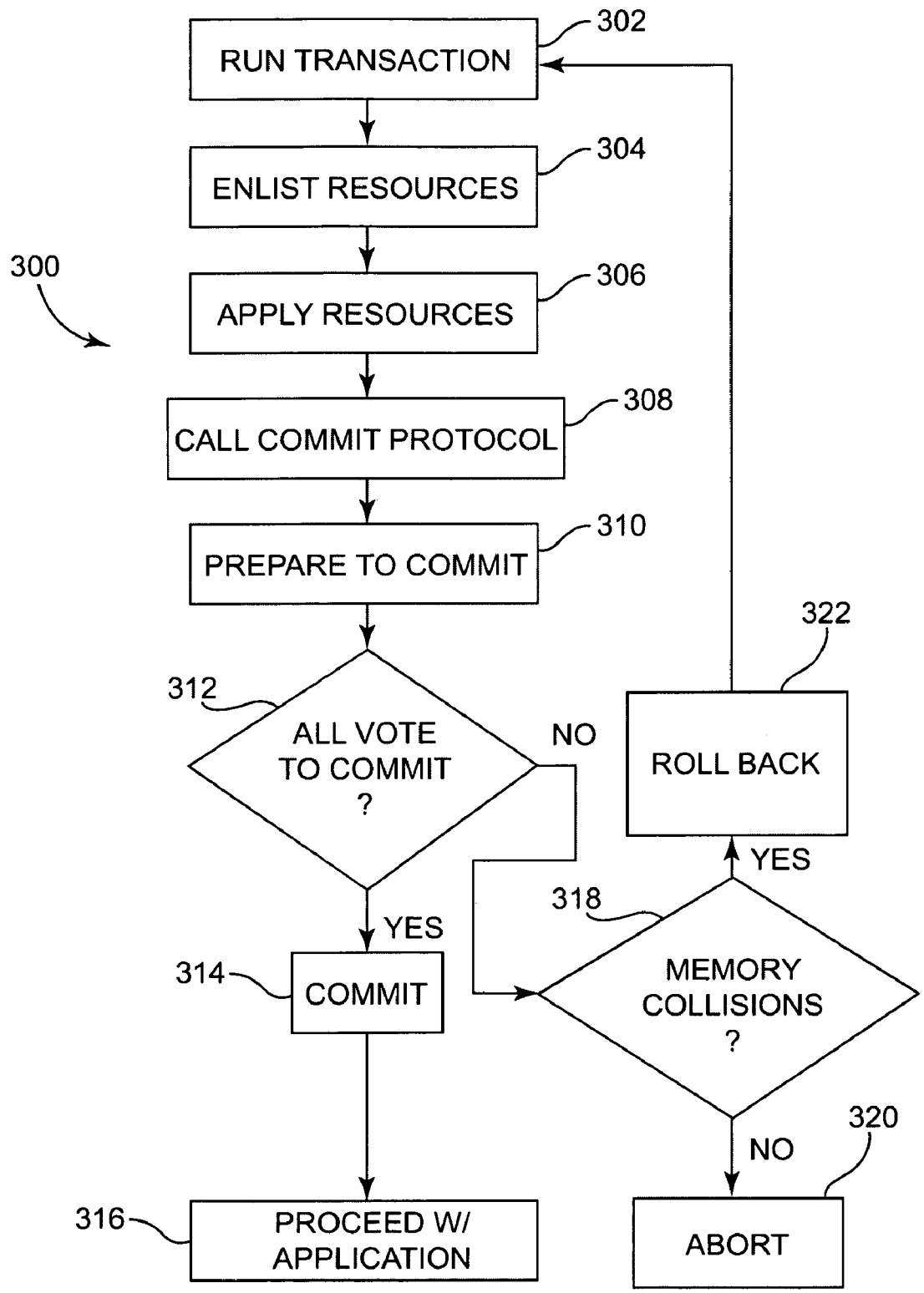
FIG. 3 is a flow diagram illustrating an example process used in the transaction system of FIG. 2.

FIG. 3 illustrates an example transaction process at 300 for use side-effecting actions in transactional memory at 302. The actions in the transaction call the resources and inform them that the action wants to perform work against it. The process automatically enlists the appropriate resource managers to work with the resource at 304. In the case of a transaction involving a side effecting action, the side-effecting operation is operated through a properly enlisted resource manager. Also, memory changes are also managed by a resource manager 210 implemented for the transactional memory. The actions can be then applied to the resources at 306.

At or near the end of the transaction, the transaction manager 216 calls the commit protocol 218 to determine whether the transaction should be rolled back in the case of memory collisions with other threads or if the changes are committed at 308. The commit protocol 218 in one example is a two-phase commit protocol including a prepare phase and a commit phase. Upon receiving a request to commit from the application, the transaction manager 216 begins the prepare phase at 310 of all the enlisted participants by calling a method on each enlisted resource manager 208, 210 in order to obtain a corresponding vote on the transaction. Each of the resource manager 208, 210 will vote to either commit or roll back by calling a prepare method or rollback method, respectively. For example, the memory action resource manager 208 can vote to commit if there are no memory collisions. In the second phase of the commit protocol 218, the transaction manager appropriately responds depending on whether it has received either all prepares from the resource managers or if it has received at least one roll back. If the transaction manager receives votes to commit from all the resource managers at 312, which have all invoked the prepare method, the transaction manger 216 invokes a commit method for each resource manager at 314. The resource managers can then make the changes durable and complete the commit or apply the deferred actions (if any) and then proceed at 316 after releasing the transaction 202. The transaction 202 continues with the application. If any resource manager voted not to commit in the prepare phase at 312, the process acts upon the failure as follows.

Failures caused by memory collisions as identified with the memory resource manager 208 are distinguishable from failures identified with the other resource managers non-memory resource managers enlisted in the transaction. For example, failures caused by memory collisions cause an automatic re-execution of the transaction at 318. In general, the application including the transaction 202 is oblivious to re-executions when they are ultimately successful. Failures identified with the other resource managers, such as resource manager 210, cause the transaction to abort and not re-execute. Accordingly, if the non-memory resource manager votes against committing the transaction at 318, the transaction fails at 320. If the memory resource manager 208 votes against committing the transaction at 318, all of the resource managers cause a roll back at 322. In this case, any compensating actions are executed at 322. If every resource manager votes to commit the transaction, the transaction commits at 314 and any deferred actions are executed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing a transaction processing system for controlling a computer system including a processing operation for a concurrent program including a plurality of threads, wherein at least one of the plurality of threads includes an atomic transaction having a side-effecting action, the transaction processing system comprising:
   a transactional memory configured to control access of the plurality of threads to a shared memory;
   a first resource manager configured to enlist in the atomic transaction and manage a non-memory resource related to the side effecting action;
   a second resource manager configured to enlist in the atomic transaction and manage the transactional memory; and
   a transaction manager coupled to the first and second resource managers, wherein the transaction manager is configured to receive a vote from the first and second resource managers as to whether to commit the atomic transaction, and configured to control the atomic transaction to include one of the following:
      postpone the side-effecting action until after the atomic transaction commits; and
      apply the side-effecting action along with a compensating action to the side-effecting action,
   wherein the second resource manager votes to commit depending on whether a memory collision occurred during the atomic transaction.

2. The computer-readable storage medium of claim 1 wherein the first and second resource managers are volatile resource managers.

3. The computer-readable storage medium of claim 2 wherein the transaction manager is a lightweight transaction manager.

4. The computer-readable storage medium of claim 1 wherein the first and second resource managers are included in a library having a plurality of resource managers selectively available to enlist in atomic transactions having side-effecting actions.

5. The computer-readable storage medium of claim 4 wherein at least one of the resource managers in the plurality of resource managers are preprogrammed in a managed environment.

6. The computer readable storage medium of claim 1 wherein the transaction manager is configured to receive a commit protocol to determine whether to commit the atomic transaction.

7. The computer-readable storage medium of claim 1 wherein the commit protocol is a two phase commit protocol including a prepare phase and a commit phase.

8. The computer-readable storage medium of claim 1 wherein the side-effecting action is selected from a group including input or output action, system calls, legacy code actions, kernel actions, device management, and actions in other domains outside of the managed environment.

9. The computer-readable storage medium of claim 8 wherein the side-effecting action is a print action.

10. A method of controlling an atomic transaction having a side-effecting action, the method comprising:
enlisting at least one non-memory resource manager;
enlisting a memory resource manager configured to manage a transactional memory;
calling a commit protocol configured to determine whether the non-memory and memory resource managers vote to commit the atomic transaction;
committing the atomic transaction if the non-memory and memory resource managers vote to commit the atomic transaction and applying the side-effecting action after the atomic transaction is committed;
re-executing the atomic transaction if the memory resource manager does not vote to commit the atomic transaction but the non-memory resource managers vote to commit the atomic transaction, wherein re-executing the atomic transaction includes one of the following:
not applying the side-effecting action; and applying the side-effecting action along with a compensating action;
aborting the atomic transaction if at least one of the non-memory resource managers does not vote to commit the atomic transaction, wherein the side-effecting action is not applied if the atomic transaction is aborted.

11. The method of claim 10 wherein the atomic transaction includes an original state and wherein re-executing the atomic transaction includes rolling back to the original state.

12. The method of claim 11 wherein re-executing the atomic transaction includes re-executing the atomic transaction until the non-memory and memory resource managers vote to commit the atomic transaction or the atomic transaction is aborted.

13. The method of claim 11 wherein changes to the original state are made durable upon committing the atomic transaction.

14. The method of claim 10 wherein re-executing the atomic transaction includes applying an open-ended compensating action to the side-effecting action.

15. The method of claim 10 wherein committing the atomic transaction includes applying a deferred action.

16. The method of claim 10 wherein determining whether the first and second resource manager vote to commit the atomic transaction includes calling a method on each enlisted resource manager to obtain a corresponding vote on the atomic transaction.

17. The method of claim 10 wherein the memory resource manager votes to commit if there are no memory collisions.

18. A computer-readable storage medium storing a managed environment operating on a computing device and configured to operate an application having an atomic transaction including a side-effecting action, the managed environment comprising:
a transactional memory;
a library of resource managers, wherein at least two of the resource managers are configured to be enlisted by the application and loaded into a volatile memory on the computing device, wherein one of the resource managers is a side-effecting resource manager configured to enlist in managing a resource related to the side-effecting action and another one of the resource managers is a memory resource manager configured to enlist in managing the transactional memory; and
a transaction manager loaded into the volatile memory and coupled to the enlisted resource managers, wherein the transaction manager is configured to receive a vote from the enlisted resource managers as to whether to commit the atomic transaction and configured to control the atomic transaction to include one of the following:
postpone the side-effecting action until after the atomic transaction commits; and
apply the side-effecting action along with a compensating action to the side-effecting action,
wherein the memory resource manager votes to commit depending on whether a memory collision occurred during the atomic transaction.

19. The computer-readable storage medium of claim 18 wherein the computing device includes a plurality of processors, and wherein the atomic transaction is included on a thread of an application having a plurality of concurrent threads.

20. The computer-readable storage medium of claim 19 wherein the transactional memory controls access to shared data on the computing device.

* * * * *